United States Patent [19]

Svensson

[11] Patent Number: 5,017,237

[45] Date of Patent: May 21, 1991

[54] CONTAMINATION REMOVAL PROCESS

[75] Inventor: Sigfrid Svensson, Furulund, Sweden

[73] Assignee: Bioboat AB, Furulund, Sweden

[21] Appl. No.: 438,447

[22] PCT Filed: Jun. 14, 1988

[86] PCT No.: PCT/SE88/00322

§ 371 Date: Jan. 16, 1990

§ 102(e) Date: Jan. 16, 1990

[87] PCT Pub. No.: WO88/10156

PCT Pub. Date: Dec. 29, 1988

[30] Foreign Application Priority Data

Jun. 17, 1987 [SE] Sweden ............... 8702535
Nov. 20, 1987 [SE] Sweden ............... 8704588

[51] Int. Cl.$^5$ .......................... B08B 7/00
[52] U.S. Cl. .................... 134/4; 427/154;
427/155; 427/156; 427/415; 435/101; 435/104
[58] Field of Search .......... 252/540, 174.17, DIG. 14,
252/174.23; 435/101, 104; 134/4; 427/154, 158,
156, 415

[56] References Cited

U.S. PATENT DOCUMENTS

| 2,811,456 | 10/1957 | Coleman | 134/4 |
| 2,877,131 | 3/1959 | Overholt et al. | 134/4 |
| 4,465,619 | 8/1984 | Boskamp | 252/DIG. 14 |
| 4,483,782 | 11/1984 | Cox et al. | 252/DIG. 14 |

FOREIGN PATENT DOCUMENTS

| 465313 | 5/1950 | Canada | 427/156 |
| 471748 | 2/1951 | Canada | 427/156 |
| 8810156 | 12/1988 | European Pat. Off. | 427/154 |
| 8810284 | 12/1988 | European Pat. Off. | 427/154 |
| 8909097 | 10/1989 | European Pat. Off. | 427/154 |
| 344453 | 3/1931 | United Kingdom | 427/155 |

*Primary Examiner*—Asok Pal
*Attorney, Agent, or Firm*—Burns, Doane, Swecker & Mathis

[57] ABSTRACT

A process for facilitating the removal of undesired contamination from a surface, comprising the steps:

(a) applying a solution containing a polysaccharide and a solvent therefor onto said surface before it is subjected to contamination, said polysaccharide being capable of forming a redissolvable or swelling solid film upon drying;

(b) allowing the applied solution to dry to form a solid film on said surface;

(c) treating the coated surface with a liquid capable of redissolving the film or providing for swelling thereof; and (d) removing the undesired contamination by removing the dissolved or swelled surface layer of the film.

22 Claims, No Drawings

CONTAMINATION REMOVAL PROCESS

The present invention relates to a process for facilitating removal of undesired contamination from a surface. In brief, the invention resides in the concept of protecting a clean surface by a polysaccharide film which, after contamination thereof, can be partly or completely removed by treatment with a suitable solvent for the polysaccharide in question.

Many surfaces exposed to the environment are continuously being contaminated by undesired deposits, such as soot, grease, dust, traffic pollution etc. Furthermore, accidental stains can be made on items, such as table cloths, carpets, clothes etc. Some types of stains can be extremely difficult or even impossible to remove. Over the last years deliberate scrawling on walls or other structures has become an increasing problem and has its origin in so called "graffiti". In paint factories, printing works and lacquering industries cleaning of containers, equipment etc. is associated with difficulties and quite generally requires strong alkaline solutions or organic solvents which cause health hazards and environmental inconvenience. Masking procedures in lacquering work are difficult to perform on curved or irregular surfaces.

The present invention has for an object to provide new techniques by which the above-indicated problems can be circumvented or at least greatly reduced.

Another object of the invention is to provide for a methodology which does not involve health hazards or other environmental inconvenience.

These and other objects of the invention which will be clear from the following are obtained by first covering the clean surface to be treated with a polysaccharide film which is capable of redissolving or swelling when contacted by a liquid comprising a solvent for said polysaccharide. The polysaccharide film thus applied to the surface involved will protect said surface from direct contamination. When contaminated undesired contamination can be easily removed from the surface by treating the contaminated surface with a liquid which is capable of redissolving the film or providing for swelling thereof, whereafter the undesired contamination can be removed by removing at least the dissolved or swelled surface layer of the film. Such removal can be obtained by any suitable technique, such as spraying, brushing, wiping, rubbing, washing or the like.

Thus, the invention provides for a process for facilitating the removal of undesired contamination from a surface, comprising the following steps:

(a) applying a solution containing a polysaccharide and a solvent therefor onto said surface before it is subjected to contamination, said polysaccharide being capable of forming a redissolvable or swelling solid film upon drying;

(b) allowing the applied solution to dry to form a solid film on said surface;

(c) treating the coated surface with a liquid capable of redissolving the film or providing for swelling thereof; and (d) removing the undesired contamination by removing the dissolved or swelled surface layer of the film.

According to an alternative procedure the facilitated removal of such undesired contamination from a surface may comprise the steps:

(a) applying a preformed polysaccharide film onto said surface which film is capable of redissolving or swelling when contacted by a liquid comprising a solvent for said polysaccharide;

(b) treating the coated surface with a liquid capable of redissolving the film or providing for swelling thereof; and (c) removing the undesired contamination by removing the dissolved or swelled surface layer of the film.

In this alternative procedure there is thus used a preformed polysaccharide film having the desired properties in regard to being capable of redissolving or swelling when treated with a suitable solvent for the polysaccharide.

With regard to the polysaccharide solution used in the process of the invention it is preferred to use an aqueous solution. Thus, a water-soluble polysaccharide is preferred to use in such solution. By the term "water-soluble polysaccharide" there is meant polysaccharide which is soluble in water in a liquid state.

In order that the polysaccharide used shall perform in a satisfactory manner it shall be capable of forming, when a solution thereof is applied to a surface, a film which is reversably dissolvable or which has the ability to swell when contacted with a solvent for the polysaccharide.

Films of the polysaccharide can be produced by solvent evaporation, wet casting or molding. Polysaccharide films can exist as supported or unsupported films. Supported films do not possess sufficient mechanical strength to be used as such but can be produced from low molecular weight carbohydrates supported by a solid substrate.

Unsupported films are typical for high molecular weight polysaccharides. Such polysaccharides having molecular weights of from $10^4$ to $2 \times 10^4$ daltons generally form unsupported films. Branched polysaccharides need higher molecular weights than linear ones to form unsupported films. Less polar polysaccharide derivatives, for example methyl ethers, may form unsupported films at molecular weights of about $8 \times 10^3$ daltons. Mechanical strength generally increases with increasing chain length up to molecular weights of $10^5$ to $10^6$ daltons.

"Bone dry" polysaccharide films are hard and brittle due to the multiplicity of hydrogen bonding sites, but under normal conditions water is always present in an amount of about 5-20% by weight providing a desired softening effect. To obtain maximum mechanical strength about 5-20% by weight of plasticizer is usually required. On exposure to water most polysaccharide films will be subject to swelling, and the degree of swelling is dependant on the extent of crystalline areas in the film.

Most polysaccharides are suitable for use in the present invention in indoor applications, whereas outdoor uses require substantial retrogradation of the polysaccharide in the film. Among suitable polysaccharides the following groups can be mentioned:

Hemicelluloses (e.g. arabinoxylans, glucomannans)
Plant gums (e.g. Guar gum, Locust bean gum)
Cellulose and derivatives thereof (e.g. ethyl celluloses, hydroxytehyl celluloses, carboxymethyl celluloses)
Starch and starch derivatives (e.g. hydroxyethyl starch)

Microbial polysaccharides (e.g. xanthan gum, curdlan, pullulan, dextran)

Algal polysaccharides (e.g. agar, carragenans, alginic acid)

Chitin, chitosan and their derivatives.

Some polysaccharides are conveniently made into films by precipitation from an aqueous solution under evaporation (e.g. Locust bean gum, dextran, xanthan). Other polysaccharides must be solubilized in alkaline media (e.g. curdlan and other β-1,3-glucans). When neutralized some of these will form supersaturated solutions capable of forming films on evaporation. Some of the polysaccharides will pass over a gel state before forming films.

The concentration of the polysaccharide used in the solution thereof may vary within broad limits and the solutions may contain up to about 25% by weight of a polysaccharide based on the weight of the solution. It is preferred that the solution does not contain more than about 10% by weight of the polysaccharide and it is particularly preferred to use a concentration of the order of 1 to 2% by weight. In general, the molecular weight of the polysaccharides will be about 1,000.

Mixtures of two or more polysaccharides may, of course, be used if desired, and such combinations of two polysaccharides, one of which has a higher dissolvability in water at a certain temperature than the other one at the same temperature, are preferred due to advantageous interaction between the two polysaccharide components. Such combination may comprise or essentially consist of:

at least a first component (a) excluding galactans constituted by a substituted β-1,4-linked glycan which is dissolvable in water of a certain temperature and which has a molecular weight (Mw) of $\geq 5 \cdot 10^4$ Daltons, preferably $\geq 10^5$ Daltons, particularly $\geq 10^6$ Daltons, and at least a second component (b), also excluding galactans, constituted by a substituted β-1,4-linked glycan which is more difficult to dissolve than said first component at said temperature, or is agar or a carrageenan.

In such composition it is preferred that component (a) is a substituted β-1,4-linked glucan, glucomannan, xylan, mannan or a β-1,4-linked polysaccharide consisting of 2-acetamido-2-deoxy-D-glucopyranos-or 2-amino-2-deoxy-D-glucopyranos entities. The substitution of the glycan of component (a) is preferably constituted by mono- or oligosaccharide groups or hydroxyalkyl, carboxyalkyl, aminoalkyl, alkyl, acyl or hydroxyalkyl(alkyloxy)alkyl.

Component (b) in the composition of the present invention is preferably a substituted β-1,4-linked glucan, glucomannan, xylan, mannan or a β-1,4-linked polysaccharide consisting of 2-acetamido-2-deoxy-D-glucopyranos- or 2-amino-2-deoxy-D-glucopyranos entities, or agar or carrageenan. The substitution of the glycan of component (b) may be the same as that of component (a).

In a preferred embodiment of the composition of this invention component (b) is a substituted β-1,4-linked glucan, glucomannan, xylan, mannan or a β-1,4-lined polysaccharide consisting of 2-acetamido-2-deoxy-D-glucopyranos or 2-amino-2-deoxy-D-glucopyranos entities, or agar or carrageenan, the substitution consisting of mono- or oligosaccharide groups or hydroxyalkyl, carboxyalkyl, aminoalkyl, alkyl, acyl or hydroxyalkyl(alkyloxy)alkyl.

According to yet another embodiment of the invention component (a) is a substituted β-1,4-linked glucan or mannan, chitin or chitosan, component (b) also being a polysaccharide selected from these or from agar and carrageenan. In such composition the substitution is preferably mono- or oligo-saccharide groups, hydroxyalkyl, carboxyalkyl, alkyl, acyl or hydroxymethyl(methyloxy)methyl.

According to another embodiment of the invention components (a) and (b) are selected from galactomannans, cellulose derivatives, chitin derivatives and chitosan derivatives. In such composition components (a) and (b) are suitably selected from galactomannans, hydroxyethyl celluloses and carboxymethyl celluloses. Components (a) and (b) are particularly selected from galactomannans, such as Guar gums and Locust bean gums.

In regard to the character of components (a) and (b) as concerns their dissolvability in water of a certain temperature, such temperature is not critical as to its level but constitutes a demarcation line between the two components in regard to dissolvability in water. However, for normal uses of the composition of the present invention at normal environmental temperatures, a practical temperature range would be from about 30° to about 50° C. although still not a limiting range. At normal room temperature a practical demarcation temperature would be about 40° C.

It is important to note that the process of the invention when practically utilized results in a solid film, wherein the polysaccharides are present in an essentially amorphous state.

The present invention is particularly suitable to use in regard to the removal of non-covering undesired contamination, such as a graffiti or scrawl type of contamination, in particular ink or paint type of contamination, especially of the lacquer based type, or environmental precipitation, such as soot, dust etc. The structure of the surface to be treated can vary between glossy surfaces, such as glass or metal, to highly porous surfaces, such as concrete or mortar surfaces. When used on porous surfaces, the cleaning of which normally is virtually impossible, the invention greatly facilitates removal of contamination therefrom and one could say in fact that the invention is the first practical solution to the problem of removal of such contamination.

The invention will in the following be further described by specific examples of a non-limiting character.

EXAMPLE 1

This example illustrates the use of the invention for the removal of undesired scrawl or graffiti from a concrete wall. In the example there is used an aqueous polysaccharide solution containing about 1% by weight of a mixture of 20% by weight of Guar gum and 80% by weight of Locust bean gum. Locust bean gum is sold by Sigma Chemical Corporation, St. Louis, U.S.A. and is a galactomannan polysaccharide originating from seeds of *Seratonia siliqua*. The Guar gum used is sold by the same company.

The solution described above is applied onto a concrete wall in three layers in a quantity of about 1 l/m². After each application the layer applied is allowed to dry. After drying of the last layer the underlying concrete wall was fully visible due to the transparence of the film.

The protected wall was then sprayed with lacquer paints of differents brands including both two component lacquers and three component lacquers. Other parts of the wall was subjected to scrawl using a waterproof felt pen. After several days of drying the contaminated wall could be easily cleaned by scrubbing with water or by using a high pressure hose. Heating the water to an increased temperature made the cleaning even easier. After drying no contamination could be seen on the concrete wall.

EXAMPLE 2

The experiment of Example 1 is repeated using Guar gum in a 1% (w/w) aqueous solution and similar results were obtained.

EXAMPLE 3

The experiment of Example 1 is repeated using a solution of Locust bean gum (1% w/w), similar results being obtained.

EXAMPLE 4

Example 1 is repeated while applying the polysaccharide solution onto a brick wall. Similar results are obtained.

EXAMPLE 5

Example 2 is repeated using galvanized steel as a test surface. The same useful results are obtained.

EXAMPLE 6

Example 1 is repeated using soluble potato starch (Sigma) in a concentration of about 2% by weight. Similar results are obtained.

EXAMPLE 7

Example 1 is repeated using chitosan (Sigma) as a 1% by weight solution in 0.5N AcOH. Substantially the same results are obtained.

EXAMPLE 8

Example 1 is repeated using hydroxyethyl cellulose (Cellosize WP-40) as a polysaccharide. Similar results are obtained.

EXAMPLE 9

Example 1 is repeated using native dextran (Pharmacia, Sweden) as a 5% by weight solution. Substantially equal results are obtained.

EXAMPLE 10

Example 1 is repeated using xanthan gum (Sigma) as an aqueous solution at 1% by weight. Similar results are obtained.

EXAMPLE 11

Example 1 is repeated using Pullulan (Sigma) as a 1% by weight aqueous solution. Substantially equal results are obtained.

EXAMPLE 12

Example 1 is repeated using Pectin (Sigma) in a concentration of 2% by weight, aqueous solution. Similar results are obtained.

What is claimed is:

1. A process for facilitating the removal of undesired contamination from a surface, comprising the steps of:
   (a) applying a solution containing a polysaccharide and a solvent therefor onto said surface before the surface is subjected to contamination, said polysaccharide being capable of forming a redissolvable or swelling solid film upon drying;
   (b) allowing the applied solution to dry to form a solid film on said surface;
   (c) treating the coated surface with a liquid capable of redissolving the film or providing for swelling thereof; and
   (d) removing the undesired contamination by removing the dissolved or swelled surface layer of the film;
   wherein the polysaccharide has a molecular weight of at least about 1000 and the solution applied to the surface contains no more than about 10% by weight of the polysaccharide.

2. A process according to claim 1, wherein under the removal step (d and c, respectively) said removal is provided by spraying, brushing, wiping, rubbing, or washing.

3. A process according to claim 1, wherein said solution is an aqueous solution.

4. A process according to claim 2, wherein said solution is an aqueous solution.

5. A process according to claim 1, wherein the polysaccharide is selected from the group consisting of celluloses and derivatives thereof, starches and derivatives thereof, plant gums, capsular microbial polysaccharides, pectins, inulins, and algal polysaccharides.

6. A process according to claim 1 for facilitating the removal of graffiti type undesired contamination on a surface.

7. A process according to claim 1 for facilitating the removal of undesired contamination in the form of environmental precipitation on a surface.

8. A process for facilitating the removal of undesired contamination from a surface, comprising the steps of:
   (a) applying a preformed polysaccharide film onto said surface which film is capable of redissolving or swelling when contacted by a liquid comprising a solvent for said polysaccharide;
   (b) treating the coated surface with a liquid capable of redissolving the film or providing for swelling thereof; and
   (c) removing the undesired contamination by removing the dissolved or swelled surface layer of the film;
   wherein the polysaccharide has a molecular weight of at least about 1000.

9. A process according to claim 8, wherein under the removal step (d and c, respectively) said removal is provided by spraying, brushing, wiping, rubbing, or washing.

10. A process according to claim 8, wherein said solution is an aqueous solution.

11. A process according to claim 9, wherein said solution is an aqueous solution.

12. A process according to claim 8, wherein the polysaccharide is selected from the group consisting of: celluloses and derivatives thereof, starches and derivatives thereof, plant gums, capsular microbial polysaccharides, pectins, inulins, and algal polysaccharides.

13. A process according to claim 8, for facilitating the removal of graffiti type undesired contamination on a surface.

14. A process according to claim 8, for facilitating the removal of undesired contamination in the form of environmental precipitation on a surface.

15. A process for facilitating the removal of undesired contamination from a surface, comprising the steps of:

(a) applying a solution containing at least one polysaccharide and a solvent therefor onto a surface substantially free of contamination, the polysaccharide being capable of forming a redissolvable or swellable solid film upon drying;

(b) drying the applied solution to form a coating of solid film on the surface;

(c) exposing the coated surface to a source of contamination, whereby contamination is retained by a surface layer of the film;

(d) treating the coated surface with a liquid which causes said surface layer to be redissolved or swelled thereby; and (e) removing the redissolved or swelled surface layer and the retained contamination, thereby exposing an uncontaminated film surface.

16. A process according to claim 15, wherein the polysaccharide is selected from the group consisting of celluloses and derivatives thereof, starches and derivatives thereof, plant gums, capsular microbial polysaccharides, pectins, inulins and algal polysaccharides.

17. A process according to claim 15, wherein two polysaccharides are present in the solution of step (a), and wherein one of said polysaccharides has a higher solubility in water than the other polysaccharide at a specified temperature.

18. A process according to claim 17, wherein the first polysaccharide is selected from the group consisting of substituted beta-1,4-linked glycans having a molecular weight of at least $5 \times 10^4$ daltons and wherein the second polysaccharide is selected from the group consisting of substituted beta-1,4-linked glycans, agar and carrageenan, the first polysaccharide having a higher aqueous solubility than the second polysaccharide at a specified temperature and wherein the polysaccharides are not galactans.

19. A process for facilitating the removal of undesired contamination from a surface, comprising the steps of:

(a) applying a preformed polysaccharide film onto a surface, said film being capable of redissolving or swelling when contacted by a liquid solvent for the polysaccharide;

(b) exposing the coated surface to a source of contamination, whereby contamination is retained by a surface layer of the film;

(c) treating the coated surface with a liquid capable of redissolving or swelling the film; (d) removing the redissolved or swelled surface layer and the retained contamination, thereby exposing an uncontaminated film surface.

20. A process according to claim 19, wherein the polysaccharide is selected from the group consisting of celluloses and derivatives thereof, starches and derivatives thereof, plant gums, capsular microbial polysaccharides, pectins, inulins and algal polysaccharides.

21. A process according to claim 19, wherein two polysaccharides are present in the solution of step (a), and wherein one of said polysaccharides has a higher solubility in water than the other polysaccharide at a specified temperature.

22. A process according to claim 21, wherein the first polysaccharide is selected from the group consisting of substituted beta-1,4-linked glycans having a molecular weight of at least $5 \times 10^4$ daltons and wherein the second polysaccharide is selected from the group consisting of substituted beta-1,4-linked glycans, agar and carrageenan, the first polysaccharide having a higher aqueous solubility than the second polysaccharide at a specified temperature and wherein the polysaccharides are not galactans.

* * * * *